R. G. BURTON.
NUT LOCK.
APPLICATION FILED DEC. 5, 1906.

901,875.

Patented Oct. 20, 1908.

WITNESSES:
E. F. Stewart
H. D. Lawson.

Rufus G. Burton,
INVENTOR.

By C. A. Snow & Co.
ATTORNEYS

UNITED STATES PATENT OFFICE.

RUFUS G. BURTON, OF BLUEFIELD, WEST VIRGINIA.

NUT-LOCK.

No. 901,875.  Specification of Letters Patent.  Patented Oct. 20, 1908.

Application filed December 5, 1906. Serial No. 346,480.

*To all whom it may concern:*

Be it known that I, RUFUS G. BURTON, a citizen of the United States, residing at Bluefield, in the county of Mercer and State of West Virginia, have invented a new and useful Nut-Lock, of which the following is a specification.

This invention has relation to nut locks and it consists in the novel construction and arrangement of its parts as hereinafter shown and described.

The object of the invention is to provide a nut lock consisting of a nut and bolt and locking key made from soft metal. Before the threads are cut in the bolt the surface of the same is provided with one or more longitudinally extending grooves. The thread is then cut in the bolt about the said grooves so that the grooves extend along the bolt for the entire length of the thread thereof. Before the thread is cut in the nut the inner surface thereof is provided with a groove which extends from one face and terminates at a point between the opposite faces of the nut. The thread is then cut in the nut. The key is of soft metal and is adapted to be forced into registering grooves in the nut and bolt and when seated its end is bent up into a radially extending channel provided upon the outer face of the nut. The nut is then turned back very slightly and its thread is forced into the soft metal of the key, consequently, it is impossible for the key to slip out of the registering grooves as it is impaled therein by the thread of the nut. By this means a simple and effective means is provided for retaining the key without complicating the nut lock or adding unnecessary parts to its structure.

Figure 1:
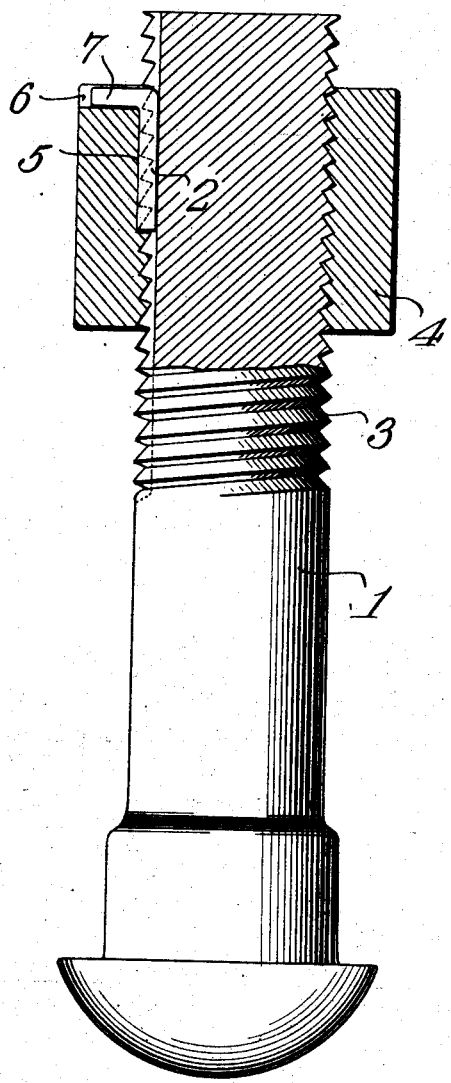
Figure 2:
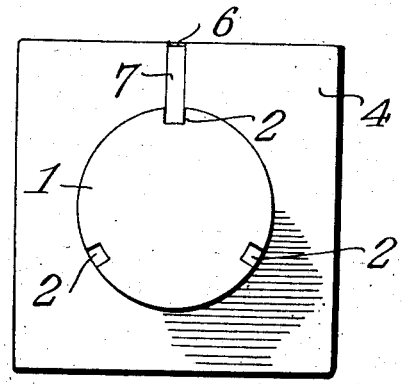
Figure 3:
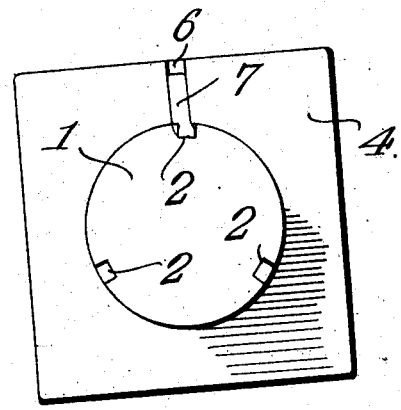

In the accompanying drawing:—Figure 1 is a side elevation of a bolt with a nut in section locked thereon. Fig. 2 is an end elevation of the nut, the bolt and the locking key, showing the position of the parts previous to impaling the key; Fig. 3 is an end elevation of the nut, the bolt and the key showing the positions of the parts after the key is impaled.

The bolt 1 is provided with one or more longitudinally extending grooves 2, 2 which are cut in the bolt previous to cutting the thread 3. By cutting the grooves first a more perfect thread may be produced upon the surface of the bolt 1; if the thread is cut first and the grooves channeled out afterwards, the tool in channeling the grooves will distort the thread to a greater or less degree. The nut 4 is provided with a groove 5 which extends from the outer face thereof to a point intermediate its inner and outer faces. The outer face of the nut 4 is provided with a radially extending channel 6 the inner end of which communicates with the outer end of the groove 5. After the groove 5 is cut the interior of the nut 4 is provided with a thread. The key 7 is made of comparatively soft metal and when the nut 4 is screwed upon the thread of the bolt 1 and the groove 5 thereof is brought into register with one of the grooves 2 of the said bolt the key 7 is driven longitudinally in the said grooves and then the outer end of the said key is bent up into the channel 6 and lies wholly within the perimeter of the nut. The nut is then given a very slight backward turn and the thread thereof enters into the soft metal of the key 7 and impales the same in the channels receiving it so that it cannot move longitudinally.

It is to be observed that the grooves in both nut and bolt are rectangular in cross section and of the same transverse dimensions and configuration, and it is further to be observed that the key is of the same transverse dimensions as the combined dimensions of the groove in the bolt and nut thread. It will be noted from an examination of Fig. 1 that the groove in the bolt extends through the thread into the body thereof and the groove in the nut likewise extends through the threads into the body thereof, and it will be observed that by reason of this the key will lie partly behind and partly in front of the points of the thread. When the nut is turned slightly backwards, the effect of this is that the points of the threads on both bolt and nut catch in the sides of the soft key and prevent its retraction. Thus, means is provided for locking the nut upon the bolt and also for positively retaining the locking key between the nut and the bolt. It is further to be observed that by reason of the groove extending only part way through the nut, an entire thread is left in the bottom of the nut. In practice it is well known that where even a slight bur is left, or a slight projection exists on the first thread of the bolt, and a similar projection exists in the first thread of the nut, it is almost impossible to start the nut properly on the bolt. It has, also, been found that if there is a good thread on the nut, such as is obtained in the present device, by not cutting the slot entirely through the nut, the same will be readily run over any projections that may exist on the bolt.

Having described my invention what I claim as new and desire to secure by Letters-Patent is:—

A nut lock comprising a bolt having a groove rectangular in cross section extending longitudinally of its thread, a nut having a groove rectangular in cross section extending along its thread from the outer face of the nut to a point intermediate of the inner and outer faces thereof and arranged to leave one or more entire threads in said nut adjacent the inner face, the said grooves of the bolt and nut being of the same transverse dimensions and configuration and the said grooves extending entirely through the threads into the body of the bolt and nut, said nut having upon its outer face a radially extending channel which communicates at its inner end with the groove in the nut, a key of comparatively soft metal which is forced into the registering grooves of the nut and bolt and having its end bent into the radially extending channel of the nut whereby the said key lies entirely within the perimeter of the nut, the transverse dimensions of the key being the same as the combined transverse dimensions of the groove in the bolt and in the nut thread.

In testimony that I claim the foregoing as my own, I have hereto affixed my signature in the presence of two witnesses.

RUFUS G. BURTON.

Witnesses:
S. H. MELCHOR,
WM. M. DOYLE.